United States Patent [19]

Bauer et al.

[11] Patent Number: 4,932,266
[45] Date of Patent: Jun. 12, 1990

[54] PRESSURE SENSOR

[75] Inventors: Hans-Peter Bauer, Ditzingen-Heimerdingen; Wolf Wessel, Oberriexingen, both of Fed. Rep. of Germany

[73] Assignee: Robert Bosch GmbH, Stuttgart, Fed. Rep. of Germany

[21] Appl. No.: 271,752

[22] PCT Filed: Mar. 5, 1988

[86] PCT No.: PCT/DE87/00096
§ 371 Date: Sep. 14, 1988
§ 102(e) Date: Sep. 14, 1988

[87] PCT Pub. No.: WO87/05998
PCT Pub. Date: Oct. 8, 1987

[30] Foreign Application Priority Data

Mar. 27, 1986 [DE] Fed. Rep. of Germany ....... 3610350

[51] Int. Cl.$^5$ .............................. G01L 7/08; G01L 9/06
[52] U.S. Cl. ............................................ 73/727; 338/4
[58] Field of Search ................... 73/115, 35, 721, 720, 73/726, 727, 754, 756, 706, DIG. 4; 338/4

[56] References Cited

U.S. PATENT DOCUMENTS 3,857,287 12/1974 Sonderegger .......................... 73/706
4,483,179 11/1984 Oshima et al. ........................... 73/35
4,570,097 2/1986 Shukla et al. .......................... 73/754
4,735,091 4/1988 Engeler et al. ........................ 73/706

Primary Examiner—Donald O. Woodiel
Attorney, Agent, or Firm—Michael J. Striker

[57] ABSTRACT

A compartment in a housing has a wall serving as a pressure diaphragm in communication with the contained fluid to be measured. A measuring element with a spherical cap is arranged in the compartment for the uniform transmission of pressure to electrically responsive pressure sensitive means on the measuring element. The measuring element contacts the pressure diaphragm at virtually only a single point. The diameter of the measuring element and, accordingly, of the compartment which includes the measuring element, can be considerably reduced, so that the mechanical strength of the pressure sensor is increased.

10 Claims, 2 Drawing Sheets

FIG. 2
FIG. 3
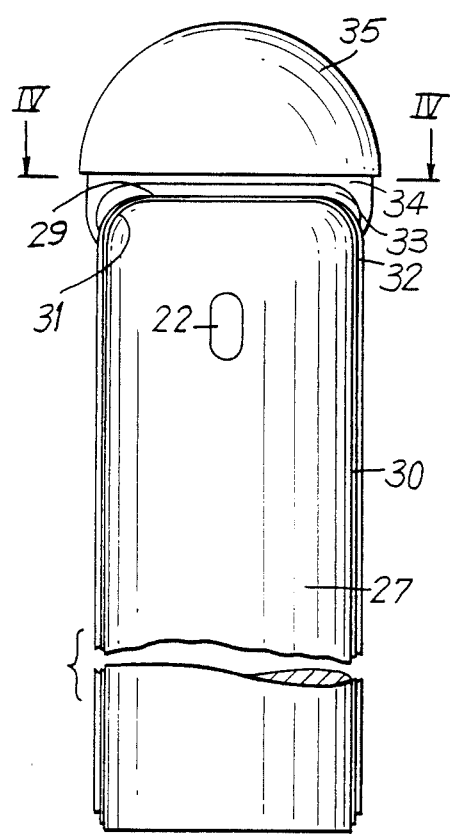
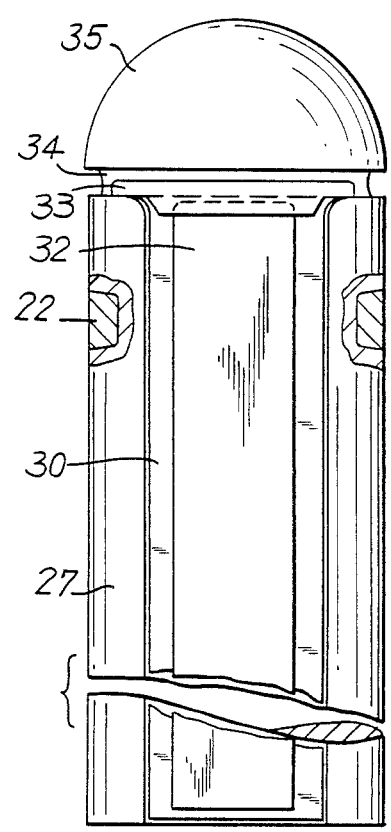
FIG. 4
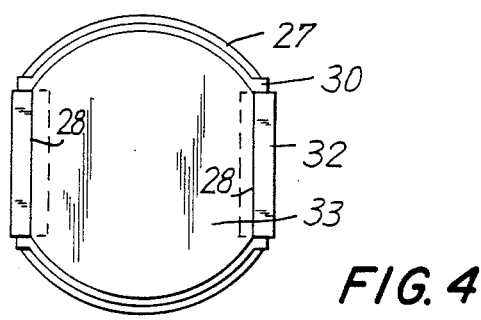

PRESSURE SENSOR

BACKGROUND OF THE INVENTION

1. Field of the Invention

This invention relates in general to fluid pressure measuring, more specifically to an assembly including a protective separator and pressure sensitive element on support means, for transmitting pressure to the element accurately over broad manufacturing and assembly tolerances.

2. Description of the Prior Art

Sensors for detecting pressures in diesel and gasoline engines, ranging from the relatively high pressure of combustion to the lower pressure of fuel delivery pumps, generally have a measuring element which includes a pressure-sensitive element on support means, in a transmitter housing that includes a compartment which extends sealingly through an opening in the pressure vessel wall of the engine or pump system and into the pressure vessel. The support means is screwed into the compartment, with the sensitive portion of the element pressed flatly against the inner surface of the compartment at a diaphragm wall which extends into the vessel wherein the diaphragm yields to the fluid pressure.

For this purpose, however, a relatively large inner diameter of the compartment is required, which reduces the strength of the transmitter housing. In addition, the pressure responsive diaphragm of the compartment wall must be against the pressure sensitive element as flat as possible. Even the smallest tolerance differences and angle errors can lead to measurement errors because of the relatively small film thickness of the pressure-sensitive element.

SUMMARY OF THE INVENTION

The pressure sensor, according to the invention, provides accurate transmission of pressure to the pressure-sensitive element with small overall dimensioning and relatively large assembly tolerances. In addition, no thread is needed for installing the support means. Accordingly, the diameter of the compartment can be relatively small, so that the mechanical strength of the housing is improved. The mechanical fastening of the measuring element of the transmitter housing is ensured in a simple manner, e.g. by means of a weld connection to the support means which may comprise a steel rod. Since no installation thread is located on the support in the area of the pressure-sensitive element and the diaphragm within the compartment, this area is free of mechanical vibrations or deformation brought about by means of the installation of the transmitter housing in the pressure vessel wall. The pressure values transmitted by the diaphragm are accordingly not falsified by means of mechanical vibrations from the pressure vessel wall. The pressure-sensitive area of the pressure sensor is decoupled to a great extent from the twisting of the transmitter housing when it is screwed into the wall.

Conductor stripes, printed on the measuring element in a simple manner make contact with a pressure sensitive resistive film outside the area of the pressure sensor that is acted upon by pressure. The conductor strips and the resistive film can overlap. Since no feed wires are needed in the critical transmitter area and no measures for insulation are needed, a simple electrical feed line to the resistive film results.

Accordingly, there is provided a pressure sensor for detecting the pressure of a fluid confined behind a wall of a pressure vessel. The pressure sensor includes pressure sensitive means, electrically responsive to mechanical pressure, located in a compartment of a housing. The compartment, which is closed relative to the fluid, includes a diaphragm in communication with the fluid, which is moveable in response to changes in the pressure of the fluid. The pressure sensitive means is mounted in the compartment for receiving mechanical pressure exerted by movement of the diaphragm. A cap is mounted between the pressure sensitive means and the diaphragm for transmitting the mechanical pressure between them.

A support body fixedly joined with the housing, positions the pressure sensitive means so that it receives the mechanical pressure from the diaphragm. In one embodiment the support body is fixedly joined to the housing by a weld. The cap may include a curved surface and further, a hemispheric surface, at point of contact with the diaphragm.

The pressure sensor comprises an insulating layer on the support body, electrical conductor strips located on the insulating layer, and a layer of material that is electrically responsive to pressure, located on the insulating layer and overlapping with the conductor strips.

The pressure sensitive means may be manufactured by thick-film technique.

BRIEF DESCRIPTION OF THE DRAWINGS

In order that the invention be more fully comprehended, it will now be described, by way of example, with reference to the accompanying drawings, in which:

FIG. 1a is a partial sectional view of the pressure sensor of FIG. 1, taken along lines 1a—1a.

FIG. 2 is a longitudinal sectional view through the measuring element of the pressure sensor.

FIG. 3 is a longitudinal partial sectional view through the measuring element of FIG. 2, taken along lines 3—3.

FIG. 4 is a sectional view of FIG. 2 taken along lines 4—4.

DESCRIPTION OF THE PREFERRED EMBODIMENTS

Figure 1:
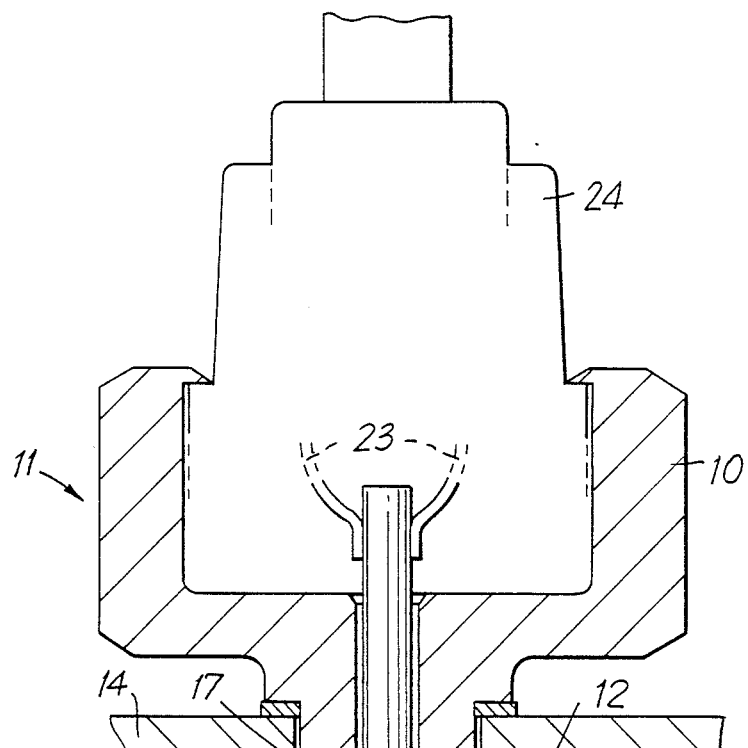
FIG. 1 is a longitudinal sectional view through a pressure sensor.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIG. 1, housing 10 of pressure sensor 11 is inserted in bore hole 13 of the wall 14 of a pressure vessel and fastened therein by thread 12. As shown, it projects through wall 14 into the pressure vessel for communication with the fluid of which the pressure or variation in pressure, is to be measured. Housing 10 can also end flush with the wall or be set back and protected in bore hole 13 so long as housing 10 is in communication with the fluid under measurement. The housing 10 comprises an approximately central compartment 15, having a base constructed as a pressure diaphragm 16. Measuring element 17 of pressure sensor 11 locates in compartment 15 against pressure diaphragm 16. External thread 12 of housing 10 does not extend as far as the end of the housing 10 which faces the pressure medium, so that the pressure diaphragm 16 is free from mechanical stresses and vibrations. In the area of this threadless portion 18, housing 10 is connected with measuring element 17 by laser and electron beam weld 22. Measuring element 17 is accordingly fastened so as to rest against pressure diaphragm 16. The strength of housing 10 is not decreased by means of the weld 22.

Figure 1A:
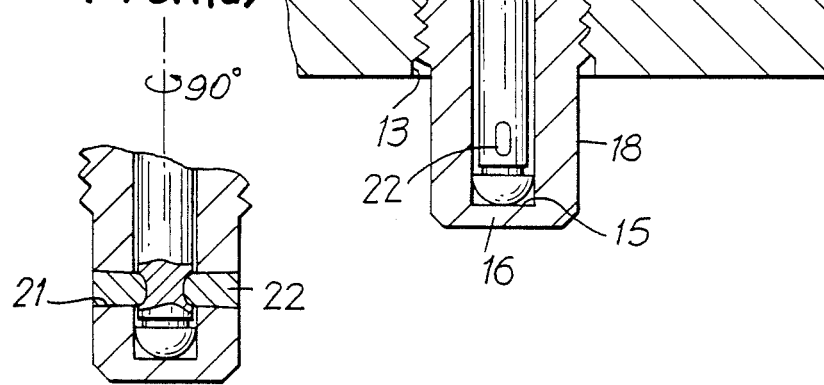

Alternatively, as may be more clearly seen in FIG. 1a, a continuous transverse bore hole 21 in portion 18 contributes to a mechanical connection produced between housing 10 and measuring element 17 with the aid of a welding or soldering connection. Instead of a welding connection, another mechanical connection, e.g. screws, can also be used. In order not to reduce the strength of the housing 10, the transverse bore hole should be of a very small diameter. The weld 22 serves both for fastening the measuring element 17 in the compartment 15 and for producing a counterforce or pretensioning for pressure diaphragm 16. Electrical lines 23 lead from measuring element 17 to an electrical connection, or to an evaluating circuit, not shown.

The measuring element 17 comprises, as shown in more detail in FIGS. 2-4, a support body 27 of cylindrical high-grade steel, which has two diametrically opposed flattened portions 28 at the longitudinal side. An insulating layer 30 of enamel work material covers flattened portions 28 and extends to end face 29 of support body 27. Body 27 has rounded edges 31, so that a good adherence of the insulating layer 30 is achieved.

Electrical conductor strips 32, e.g. of silver palladium, are applied by any thick or thin film conventionally known technique on the insulating layer 30 at the flattened portions 28 and approximately along the edges 31. A pressure-sensitive resistor 33 is located on end face 29 of body 27 on the insulating layer 30. Resistor 33 and conductor strips 32 overlap in the area of the edges 31. The resistor 33 can work on the basis of known piezo-resistive effect and is printed on, particularly by thick-film technique. A cover layer 34, which extends over the point of overlapping between resistor 33 and conductor strips 32, is located on resistor 33. The cover layer 34 serves as protection for the resistor and also as a cementing connection for a cap 35 which is placed on the end face 29 of support body 27. This cap 35 is produced from a hard material, preferably of hardened steel or ceramic. Cap 35 can be designed as a hemisphere or with a curved surface. It can take the form of a half ball on end face 29 as shown in FIGS. 2, 3 and 4.

It is important that the contact of the cap 35 on the pressure diaphragm 16 be in the shape of the radius of a point or dot, i.e. that the support be punctiform.

The welding connections 22 are arranged on body 27 to avoid damage to resistor 33.

The mode of operation of pressure sensor 11 is sufficiently known and is therefore only explained briefly here. The bending produced by the pressure of the fluid against pressure diaphragm 16 is transmitted to resistor 33 in a uniform manner by means of the cap 35. Since cap 35 contacts the pressure diaphragm 16 in a virtually punctiform manner, the latter need not itself be constructed so as to be exactly flat and parallel to resistor 33. Maximum displacement of the pressure diaphragm 16 is transmitted uniformly and with minimum error to resistive film 33 by means of the planar side of cap 35. Non-linearities of the measurement value due to asymmetrical pressing on resistor 33 can be prevented by means of the punctiform contact between cap 35 and the diaphragm. The flat surface (the side facing the resistive film) of the cap can more easily be constructed with substantially less roughness than the inner surface of the diaphragm. Multiple pressure points against resistor 33 from a rough diaphragm surface, leading to a non-linear characteristic data line is thereby avoided. Cap 35 can also have a curved surface instead of a hemispherical one. The smaller the mass of cap 35, the better the dynamics of the pressure sensor 11.

In an alternate embodiment, not shown, the base of the compartment comprising the diaphragm, is curved. The radius of the base and the cap must be different, from one another, however, in order to avoid jamming.

The pressure sensors of the present invention can be used in an advantageous manner in pressure measurement in distributor pumps of fuel injection systems and in combustion pressure measurement in diesel or gasoline engines, because they can be assembled with looser tolerances suitable for low cost mass production Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A pressure sensor for detecting the pressure of a fluid confined behind a wall of a pressure vessel, said pressure sensor comprising pressure-sensitive means electrically responsive to pressure, which changes its electrical properties under the influence of mechanical pressure; a housing for said pressure-sensitive means, said housing comprising a compartment for receiving said pressure-sensitive means, said compartment being closed relative to the fluid, the pressure of which is to be determined, said compartment comprising wall means in communication with said fluid and movable in response to changes in pressure of said fluid, said pressure-sensitive means being mounted in said compartment for receiving mechanical pressure exerted by movement of said wall means; a cap mounted between said pressure-sensitive means and said wall means for transmitting the mechanical pressure between said wall means and said pressure-sensitive means, said cap being in punctiform contact with said wall means for transmitting of pressure between said wall means and said pressure-sensitive means; a support body, fixedly joined with said housing for positioning said pressure-sensitive means for receiving of mechanical pressure exerted by movement of said surface means, said pressure-sensitive means being mounted on said support body; said pressure sensor further comprising a thread for mounting said pressure sensor in said wall of said pressure vessel, said thread being exclusive of the area surrounding said pressure-sensitive means; and said housing having a transverse bore hole in the region between said pressure-sensitive means and the external thread, and mechanical means located in said bore hole for fixedly joining said support body with said housing.

2. A pressure sensor for detecting pressure of a medium confined in a closed chamber defined by a wall, said pressure sensor comprising a housing; a pressure-sensitive film resistor having pressure-dependent electrical properties, electrical conductor means for transmitting an electrical signal generated by said film resistor in response to changes in the electrical properties thereof; a carrier mounted inmovably relative to said housing for supporting said film resistor and said electrical conductor means, said carrier having an end portion extending to the chamber and defining a closed hollow space, said end portion having a rigid bottom wall on which the pressure of the medium acts, said film resistor being located in said closed hollow space; and a cap extending between said bottom wall and said film resistor in direct contact with said film resistor for transmitting pressure acting on said bottom wall to said film resistor and engaging said bottom wall in a substantially punctiform manner to permit operation with large tolerances.

3. A pressure sensor as set forth in claim 2, wherein said cap is formed of a pressure-transmitting material.

4. A pressure sensor as set forth in claim 2; further comprising a measuring element extending inside said carrier for supporting said film resistor and means for fixedly connecting said measuring element with said carrier.

5. A pressure sensor as set forth in claim 4, wherein said housing has an inner thread, and said carrier has an outer thread extending only until an area in which said film resistor is located for engaging said inner thread of said housing for mounting said carrier in said housing.

6. A pressure sensor as set forth in claim 5, wherein said carrier has an axial portion extending between the area in which said film resistor is located and an end of said thread, and at least one transverse opening formed in said axial portion for receiving said fixedly connecting means.

7. A pressure sensor as set forth in claim 4, wherein said fixedly connecting means comprises a welded joint produced by one of laser welding and electronic beam welding.

8. A pressure sensor as set forth in claim 2; further comprising an insulating layer for supporting said film resistor on said measuring element and strip conductors, said insulating layer and said strip conductors being attached to said measuring element by a thick-film technique, and said strip conductors and said film resistor overlapping each other.

9. A pressure sensor as set forth in claim 4, wherein said cap has a curved surface that engages said bottom wall.

10. A pressure sensor as set forth in claim 4, wherein said cap has a semi-spherical shape that engages said bottom wall.

* * * * *